Figure 1:
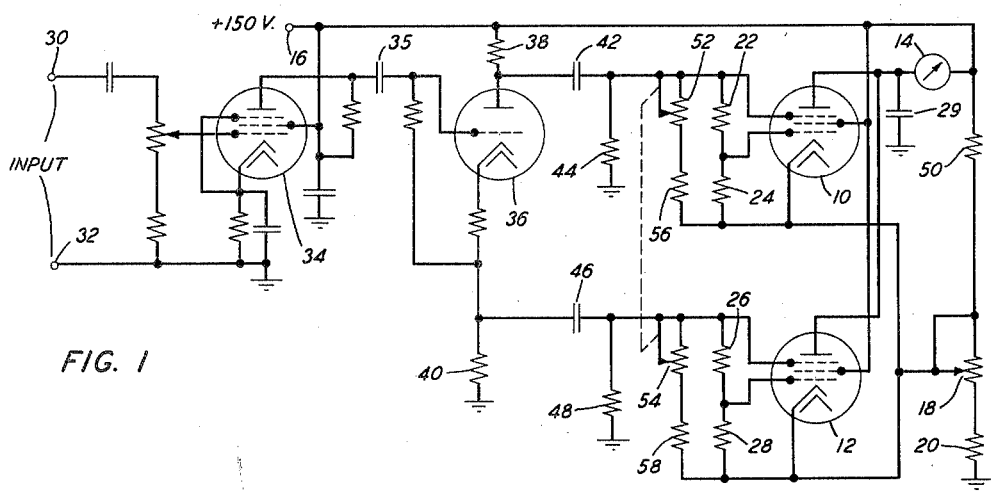

Sept. 18, 1956 H. G. FOLLINGSTAD 2,763,837
ELECTRONIC SQUARE-LAW METER CIRCUIT
Filed July 26, 1952

INVENTOR
H. G. FOLLINGSTAD
BY
ATTORNEY

United States Patent Office 2,763,837
Patented Sept. 18, 1956

2,763,837

ELECTRONIC SQUARE-LAW METER CIRCUIT

Henry G. Follingstad, Westfield, N. J., assignor to Bell Telephone Laboratories, Incorporated, New York, N. Y., a corporation of New York Application July 26, 1952, Serial No. 301,080

4 Claims. (Cl. 324—132)

This invention relates to electronic meter circuits and more particularly to electronic square-law voltmeters.

Electronic voltmeters having a square-law characteristic have been employed for measuring directly the root mean square value of applied alternating current voltages. Circuits having a square-law characteristic produce in response to an applied alternating current wave a resulting current having both alternating current and direct current components. The predominant component so produced is a direct current which is proportional to the square of the applied wave.

Electronic circuits of this general type have ordinarily been based upon the fact that a pentode type vacuum tube has a plate current versus grid voltage characteristic which is essentially parabolic over at least a part of the range of grid voltages. Expressed in other words, the plate current is proportional to the square of the grid voltage or $i_p = K e_g^2$. It has also been common to increase the sensitivity of pentode type square-law circuits by providing two tubes connected in a so-called push-push circuit. Thus, the laternating current signal to be measured appears on the grids of the two tubes as a push-pull signal and the two anodes are connected together and to a common load circuit. With this arrangement the sensitivity of the circuit is doubled as contrasted with that obtainable with a single pentode tube.

As a still further improvement in such square-law circuits it has been proposed by H. McG. Ross and A. L. Shuffrey in an article entitled "An Electronic Square-law Circuit" in the Journal of Scientific Instruments, for June 1948, at pages 200 through 202, to apply the alternating current signal to be measured to the suppressor grids of the two push-push connected pentodes as well as to the control grids thereof. This arrangement affords an increased sensitivity by exploiting the large suppressor grid to plate transconductance. From another point of view this action may be looked upon as involving the application to the electron stream, which is already influenced by the action of the control grid, of a second and amplifying influence resulting from the suppressor grid.

It is an object of the present invention to afford such an enhancement of the sensitivity of a square-law meter circuit together with an increase in the extent of the square-law operating range and to provide means for facilitating the accurate adjustment of the circuit characteristics to the ideal square-law condition.

In accordance with the invention, therefore, there is provided a sensitive electronic voltmeter comprising a pair of electronic tubes having square-law characteristics and connected in a push-push circuit. An indicating meter is connected in the common anode circuit and a phase inverter provides the requisite push-pull input in response to an applied single-sided alternating current signal to be measured. The push-pull input signals are applied as to each tube in a fixed ratio to the control and suppressor grids. A circuit is provided for applying variable bias voltages to the grids without varying the signal levels. The range over which a true square-law characteristic is obtained is extended through the provision in the circuit common to the cathodes of the two tubes of an element presenting an impedance to the second harmonic of the applied signal to cause degenerative feedback of that harmonic.

Figure 2:
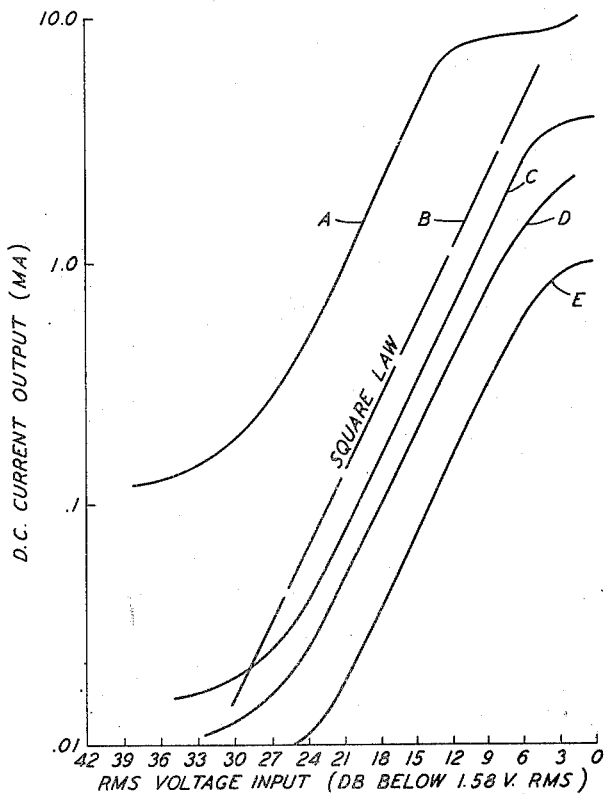

The above and other features of the invention will be described in the following detailed specification taken in connection with the drawings in which:

Fig. 1 is a schematic circuit diagram of an electronic vacuum tube voltmeter according to the invention; and Fig. 2 is a graph comparing certain characteristics of square-law meter circuits of the prior art with the corresponding characteristics of the improved circuit according to the present invention.

As shown in Fig. 1 the meter circuit comprises a pair of pentode type tubes 10 and 12 connected in a push-push circuit in which the anodes are connected together and through an indicating meter 14 to a source of positive potential at terminal 16, the negative terminal of the source being connected to ground. The cathodes of the two tubes are connected together and through a portion of the winding of a potentiometer 18 and a series resistor 20 to ground. The screen grids are connected to the source of positive potential at 16 in the usual manner. The suppressor grid of tube 10 is connected to the cathode thereof through series connected resistors 22 and 24 while the control grid is connected to the junction of these two resistors. The grid circuits of tube 12 are identical to those of tube 10, the suppressor grid being connected to the cathode through series resistors 26 and 28 and the control grid thereof being connected to the junction of these resistors. Alternating current components of the plate circuit are by-passed to ground through a capacitor 29 and the meter 14 responds only to the predominant direct current term which is proportional to the square of the grid voltage.

Although the square-law circuit of the invention may be used in many applications, it is expected that the most usual application will be as a root mean square vacuum tube voltmeter to which in the normal course of events a single-sided input signal is applied. In the present circuit such a signal may be taken as being applied between terminals 30 and 32, the latter of which is connected to ground. Conveniently, this signal undergoes amplification in a conventional class A amplifier which may comprise a pentode type tube 34 connected in the usual manner. The output of this amplifier is connected through a coupling capacitor 35 to the control grid of a conventional single triode, paraphase amplifier or phase inverter 36. In this circuit there are provided two output signals which are accurately in phase opposition, one appearing across anode resistor 38 and the other across a portion 40 of the cathode resistor. The push-pull signal thus obtained from the single sided input signal is applied through two coupling circuits, one comprising capacitor 42 and resistor 44 and the other capacitor 46 and resistor 48, to the grid circuits of square-law tubes 10 and 12 respectively. It will be recognized that by virtue of the provision of the voltage divider resistors between the suppressor grids of these tubes and the cathodes thereof, the input signals applied to the respective tubes appear in a fixed ratio on the suppressor and control grids. The advantages obtained by the arrangement disclosed in the article of Ross and Shuffrey referred to above are thereby obtained.

The performance of the circuit including the features thus far described is illustrated by the curve A of Fig. 2. This curve shows the relationship between the direct current output in milliamperes of the square-law circuit plotted on a logarithmic scale and the root mean square input voltage in decibels below a standard level and may be contrasted with dashed line B which is a true square-law characteristic as it appears when plotted in the same way. Curve A is the full equivalent of the more usual paraboloidal plate current versus grid voltage curve which is obtained when the same information is plotted on linear coordinates. Any departure of such a curve from a true parabolic form is reflected as a non-linearity of the corresponding portion of curve A in Fig. 2. It will be noted that the range over which the characterisitc as plotted in Fig. 2 is linear extends over a range of input voltages equal to approximately only 12 decibels.

In the circuit according to the present invention a marked improvement in the extent of the linear range and in the performance of the meter at the lower limit of the linear range is obtained. This improvement results from the provision of means for feeding back to at least the control grids and preferably to both the control and suppressor grids of the square-law tubes a voltage which is proportional to the plate current.

It will be recalled that the cathodes of square-law tubes 10 and 12 are connected together and through a portion of potentiometer 18 and series resistor 20 to ground. These resistors are unbypassed and consequently provide for degenerative feedback to both the control and suppressor grids of the tubes of a quantity proportional to the sum of the plate currents. In the circuit as shown in Fig. 1 and by virtue of the phase reversal between the control grids of the two square-law tubes, the odd order terms contributing to the combined cathode current are small as compared to the even order terms. Further, and by virtue of the fact that these tubes have parabolic characteristics the second order or squared term predominates among the even order terms.

Thus the combined cathode or plate current is largely proportional to the square of the grid voltage and it is the accuracy with which this proportionality is maintained which determines the performance of the circuit as a square-law device. Degenerative feedback of the type resulting from the use of an unbypassed cathode resistor results in the application to the control grid of a feedback voltage proportional to the plate current. This acts to make the $i_p = K e_g^2$ relationship shown in Fig. 2 linear over a greater range in much the same way as in an ordinary amplifier degenerative feedback from the cathode linearizes the corresponding $i_p = K e_g$ relationship. Curves C, D, and E of Fig. 2 illustrate the effects of different (in this case, increasing) amounts of such degenerative feedback of the second harmonic component of the plate current. It will be recognized that the range over which the characteristic is linear is much extended, for example, to a range equal to 21 decibels in the case of curve C and that the lower limit of the linear range which is of importance in determining the usable sensitivity of the circuit is considerably extended.

Also, in accordance with the invention, means are provided for facilitating adjustment of the slope of the characteristic shown in Fig. 2 for the purpose of matching the characteristic to a predetermined scale such that the value of the grid voltage (corresponding to the voltage to be measured) may be read directly and also to minimize inaccuracies resulting from tube aging or from the replacement of tubes in the circuit. Normally and as shown in Fig. 1, the grids of the square-law tubes are effectively biased negatively with respect to the cathodes. For this purpose there is provided a voltage divider comprising resistor 50, the winding of a variable resistor 18, and resistor 20, connected in series between the source of positive potential at 16 and ground and the grids of the two tubes are connected to the movable contact of the variable resistor as pointed out above. Adjustment of the effective bias is afforded by variable resistor 18 and results in particular advantages which will be referred to hereinafter. In the circuit of Fig. 1, however, potentiometer 18 serves as a coarse control of the bias and a fine bias adjustment is afforded by variable resistors 52 and 54 and series resistors 56 and 58 connected between the suppressor grids and cathodes of the two square-law tubes 10 and 12 respectively. The movable contacts of the two variable resistors are ganged together as shown to provide for identical adjustment of the bias voltages applied to the two tubes.

It is to be noted that these bias control circuits make possible adjustment of the absolute values of the bias voltages which are applied to the suppressor and control grids of the two tubes in the same fixed ratio at which the signal voltages are applied to the same tube elements. The over-all plate current characteristic for either of the tubes is essentially parabolic but its exact shape depends upon two contributing factors. These are the characteristic of plate current as a function of control grid voltage and that of plate current as a function of suppressor grid voltage. While both of these characteristics are essentially parabolic in shape, any variation in operating points thereon by varying absolute bias levels or the ratio of the bias voltages applied to the two grids will affect the shape of the overall characteristic and the degree to which it approaches a true parabolic form. Such variations then affect the slope of the characteristic when plotted as shown in Fig. 2 on what is essentially a log-log graph.

Bias adjustments causing such changes permit changes in the slope of the combined plate current characteristic of the two tubes and facilitate matching of the characteristic to the ideal square-law characteristic having a slope of 2 as indicated by curve B of Fig. 2. This will be understood also to be of an advantage in compensating for aging of one or both of the tubes or for the differences between substituted tubes of the same types in that it permits adjustment of the contributions of the control and suppressor grids in the determination of the over-all plate current and thus of the shape of the composite characteristic curve.

Adjustment of the absolute bias levels within reasonable limits does not materially affect the sensitivity of the circuit. Adjustment of the ratio of control and suppressor grid biases normally results in a corresponding change in the ratio at which signals are applied to the same elements and may result in a loss of sensitivity. This may be compensated however by increasing the gain of input amplifier 34.

What is claimed is:

1. A square-law circuit comprising a pair of tubes each including an anode, a cathode, a control grid and at least one other grid element and presenting parabolic plate current characteristics, a source of potential, means for connecting said anodes together and through a work circuit to one terminal of said source of potential, a voltage divider associated with and connected between the other grid element and the cathode of each of said tubes, means for applying an input signal to said tubes in push-pull relationship between the respective other grids and the other terminal of said potential source, means for connecting the control grids of said tubes to the junctions of the respective voltage dividers, means for applying bias voltages in a given ratio to said other grids and control grids for each of the respective tubes and means for varying the absolute values of said bias voltages in said ratio.

2. A square-law circuit comprising a pair of tubes each including an anode, a cathode, a control grid and a suppressor grid element and presenting parabolic plate current characteristics, a source of potential, means for connecting said anodes together and through an indicator to one terminal of said source of potential, voltage dividers connected between the suppressor grids and cathodes of said tubes, means for applying an input signal to said tubes in push-pull relationship between the respective suppressor grids and the other terminal of said potential source, means for connecting the control grids of said tubes to the junctions of the respective voltage dividers, means for connecting said cathodes together and to said other terminal including an element presenting an impedance to the second harmonic of said input signal to cause degenerative feedback of said harmonic, means including said element for applying a bias voltage to the cathodes of said tubes and means for varying the value of said bias voltage comprising identically variable resistors connected across the respective voltage dividers associated with each of said tubes.

3. A square-law circuit comprising a pair of tubes each including an anode, a cathode, a control grid and a suppressor grid element and presenting parabolic plate current characteristics, a source of potential, means for connecting said anodes together and through an indicator to one terminal of said source of potential, voltage dividers connected between the suppressor grids and cathodes of said tubes, means for applying an input signal to said tubes in push-pull relationship between the respective suppressor grids and the other terminal of said potential source, means for connecting the control grids of said tubes to the junction of the respective voltage dividers, means for applying bias voltages in fixed ratio to said suppressor and control grids of the respective tubes, and means including a variable element connected between said cathodes and the other terminal of said potential source and presenting an impedance to the second harmonic of the input signal.

4. A square-law vacuum tube voltmeter for measuring the root mean square amplitude of single sided input signals comprising a pair of tubes each including at least an anode, a cathode, a control grid and a suppressor grid and presenting parabolic plate current characteristics, a source of potential, means for connecting said anodes together and through an indicator to one terminal of said source of potential, a phase inverter tube connected to accept said single sided input signals and provide push-pull signals for application between the control grids of the respective tubes and the other terminal of said potential source, means for applying said signals also to said suppressor grids in a fixed amplitude ratio to the signals applied to said control grids, means for connecting the cathodes of said tubes together and to said other terminal including an element presenting an impedance to the second harmonic of said applied signal, means for applying bias voltages in said fixed ratio to said control and suppressor grids and means for varying the absolute values of said bias voltages without varying said ratio.

References Cited in the file of this patent

UNITED STATES PATENTS

| | | |
|---|---|---|
| 2,399,441 | Krebs | Apr. 30, 1946 |
| 2,541,326 | Bielek | Feb. 13, 1951 |

OTHER REFERENCES

Publication I, Journal of Scientific Instruments, vol. 25, No. 6, June 1948, pp. 200–202.

Publication II, Electronics, Feb. 1948, page 134.

Publication III, QST, Aug. 1945, page 37.